United States Patent
Bhandari

(10) Patent No.: US 9,541,396 B2
(45) Date of Patent: Jan. 10, 2017

(54) MULTI-AXIS INTEGRATED INERTIAL SENSING DEVICE

(71) Applicant: mCube Inc., San Jose, CA (US)

(72) Inventor: Sanjay Bhandari, San Jose, CA (US)

(73) Assignee: mCube Inc., San Jose, CA (US)

( * ) Notice: Subject to any disclaimer, the term of this patent is extended or adjusted under 35 U.S.C. 154(b) by 468 days.

(21) Appl. No.: 14/160,549

(22) Filed: Jan. 21, 2014

(65) Prior Publication Data

US 2015/0276407 A1    Oct. 1, 2015

Related U.S. Application Data

(60) Provisional application No. 61/755,453, filed on Jan. 22, 2013, provisional application No. 61/755,450, filed on Jan. 22, 2013, provisional application No. 61/755,451, filed on Jan. 22, 2013.

(51) Int. Cl.

| G01C 19/00   | (2013.01) |
|---|---|
| G01P 3/44    | (2006.01) |
| G01P 9/00    | (2012.01) |
| G01P 15/08   | (2006.01) |
| G01C 19/5776 | (2012.01) |
| G01C 19/5783 | (2012.01) |
| G01P 15/18   | (2013.01) |

(52) U.S. Cl.
CPC ....... *G01C 19/5776* (2013.01); *G01C 19/5783* (2013.01); *G01P 15/18* (2013.01)

(58) Field of Classification Search
CPC .... B81B 7/008; B81B 7/02; B81B 2201/0235; B81B 2201/0242

USPC ............................ 73/504.04, 504.12, 504.18
See application file for complete search history.

(56) References Cited

U.S. PATENT DOCUMENTS

| 2010/0307241 A1* | 12/2010 | Raman ............... G01C 19/56 73/504.12 |
| 2011/0197674 A1* | 8/2011 | Prandi ............... G01C 19/5726 73/504.12 |

* cited by examiner

*Primary Examiner* — Lisa Caputo
*Assistant Examiner* — Roger Hernandez-Prewit
(74) *Attorney, Agent, or Firm* — Kilpatrick Townsend and Stockton LLP

(57) ABSTRACT

A system comprising an integrated multi-axis MEMS inertial sensor architecture. The system can include a MEMS gyroscope having a MEMS resonator and a MEMS accelerometer overlying a CMOS IC substrate. The CMOS IC substrate can include low noise Charge Sense amplifiers to process the sensed signals, programmable gain amplifiers, a demodulator, mixer, an AGC loop circuit coupled to the MEMS gyroscope to drive MEMS resonator. The CMOS IC also includes programmable Quadrature cancellation, Analog and digital phase shifters are implemented in the architecture to ensure quadrature cancellation and demodulation to achieve optimal performance. The AGC loop acts in a way such that generated desired signal amplitude out of the drive signal maintains MEMS resonator velocity at a desired frequency and amplitude while consuming low power. The MEMS gyroscope and accelerometer can be coupled to an input multiplexer configured to operate in a time-multiplexed manner.

20 Claims, 3 Drawing Sheets

MULTI-AXIS INTEGRATED INERTIAL SENSING DEVICE

CROSS-REFERENCES TO RELATED APPLICATIONS

The present application claims priority to and incorporates by reference, for all purposes, the following pending patent applications: U.S. patent application Ser. No. 14/158,765, filed Jan. 17, 2014, and U.S. patent application Ser. No. 14/158,756, filed Jan. 17, 2014.

BACKGROUND OF THE INVENTION

The present invention is directed to MEMS (Micro-Electro-Mechanical-Systems). More specifically, embodiments of the invention provide methods and structure for improving integrated MEMS devices, including inertial sensors and the like. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

Research and development in integrated microelectronics have continued to produce astounding progress in CMOS and MEMS. CMOS technology has become the predominant fabrication technology for integrated circuits (IC). MEMS, however, continues to rely upon conventional process technologies. In layman's terms, microelectronic ICs are the "brains" of an integrated device which provides decision-making capabilities, whereas MEMS are the "eyes" and "arms" that provide the ability to sense and control the environment. Some examples of the widespread application of these technologies are the switches in radio frequency (RF) antenna systems, such as those in the iPhone™ device by Apple, Inc. of Cupertino, Calif., and the Blackberry™ phone by Research In Motion Limited of Waterloo, Ontario, Canada, and accelerometers in sensor-equipped game devices, such as those in the Wii™ controller manufactured by Nintendo Company Limited of Japan. Though they are not always easily identifiable, these technologies are becoming ever more prevalent in society every day.

Beyond consumer electronics, use of IC and MEMS has limitless applications through modular measurement devices such as accelerometers, gyroscopes, actuators, and sensors. In conventional vehicles, accelerometers and gyroscopes are used to deploy airbags and trigger dynamic stability control functions, respectively. MEMS gyroscopes can also be used for image stabilization systems in video and still cameras, and automatic steering systems in airplanes and torpedoes. Biological MEMS (Bio-MEMS) implement biosensors and chemical sensors for Lab-On-Chip applications, which integrate one or more laboratory functions on a single millimeter-sized chip only. Other applications include Internet and telephone networks, security and financial applications, and health care and medical systems. As described previously, ICs and MEMS can be used to practically engage in various type of environmental interaction.

Although highly successful, ICs and in particular MEMS still have limitations. Similar to IC development, MEMS development, which focuses on increasing performance, reducing size, and decreasing cost, continues to be challenging. Additionally, applications of MEMS often require increasingly complex microsystems that desire greater computational power. Unfortunately, such applications generally do not exist. These and other limitations of conventional MEMS and ICs may be further described throughout the present specification and more particularly below.

From the above, it is seen that techniques for improving operation of integrated circuit devices and MEMS are highly desired.

BRIEF SUMMARY OF THE INVENTION

The present invention is directed to a device or system architecture for a multi-axis MEMS (Micro-Electro-Mechanical-Systems). More specifically, embodiments of the invention provide a structure for an integrated multi-axis MEMS gyroscope/accelerometer device, including inertial sensors and the like. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

The present invention includes a device architecture for an integrated MEMS gyroscope system. This system architecture includes a gyro MEMS block, which can be a single or multi-axis MEMS gyroscope element. The sensing element is shown as capacitive but other sensing elements are also possible and the first amplifier interfacing with the MEMS element is designed appropriately. The MEMS gyroscope can include sense capacitors coupled to a sense path and drive feedback capacitors coupled to a drive path. As shown, the X, Y, and Z axis outputs of the MEMS gyro from a programmable gain amplifier (PGA2) are shown to be coupled to an input multiplexer.

The present invention also includes an integrated MEMS accelerometer coupled to the MEMS gyroscope system. The accel MEMS block, which can be a single or multi-axis MEMS accelerometer element, also includes an X, Y, and Z axis output that are coupled to the input multiplexer. In a specific embodiment, this configuration with a 3-axis gyro and a 3-axis accel results in a 6 degrees-of-freedom (DOF) integrated inertial sensor system.

Various additional objects, features and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present invention is directed to MEMS (Micro-Electro-Mechanical-Systems). More specifically, embodiments of the invention provide a system having an integrated MEMS gyroscope architecture. Embodiments described herein will cover various aspects for specific applications, but it will be recognized that the invention has a much broader range of applicability.

Figure 1:
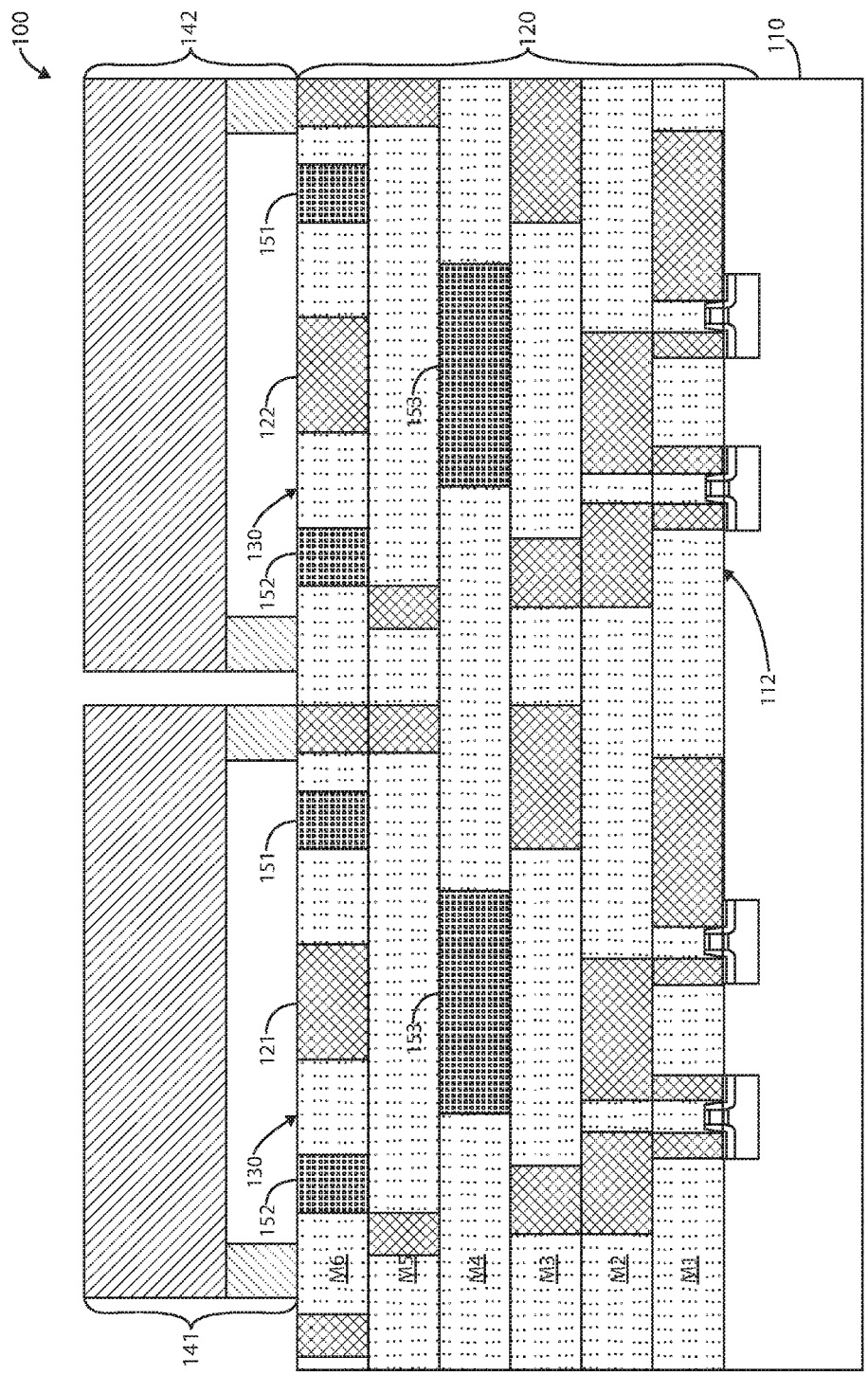
FIG. 1 is a simplified diagram illustrating a cross-sectional view of an integrated MEMS inertial sensing device according to an embodiment of the present invention.

FIG. 1 is a simplified diagram illustrating a cross-sectional view of an MEMS inertial sensing device according to an embodiment of the present invention. The integrated MEMS inertial sensing device 100 includes a substrate 110 having a surface region 112, and a CMOS layer 120 overlying surface region 112 of substrate 110. CMOS layer 120 has a CMOS surface region 130. In some embodiments, CMOS layer 120 can include processed CMOS devices in substrate 110 and can including multilevel metal interconnect structures. The example shown in FIG. 1 includes six metal layers, M1-M6. The integrated MEMS inertial sensing device 100 also includes a first MEMS inertial sensor 141, e.g., a MEMS gyroscope, and a second MEMS inertial sensor 142, e.g., a MEMS accelerometer overlying the CMOS surface region, and includes out-of-plane sense plates 121 and 122. Integrated MEMS inertial sensing device 100 can also include metal shielding within a vicinity of the MEMS device configured to reduce parasitic effects. In the example of FIG. 1, metal regions 151 and 152 are shields on the sides of the plates, while 153 is the shield below the plates in the metal 4 level. Those of ordinary skill in the art will recognize other variations, modifications, and alternatives.

Figure 2:
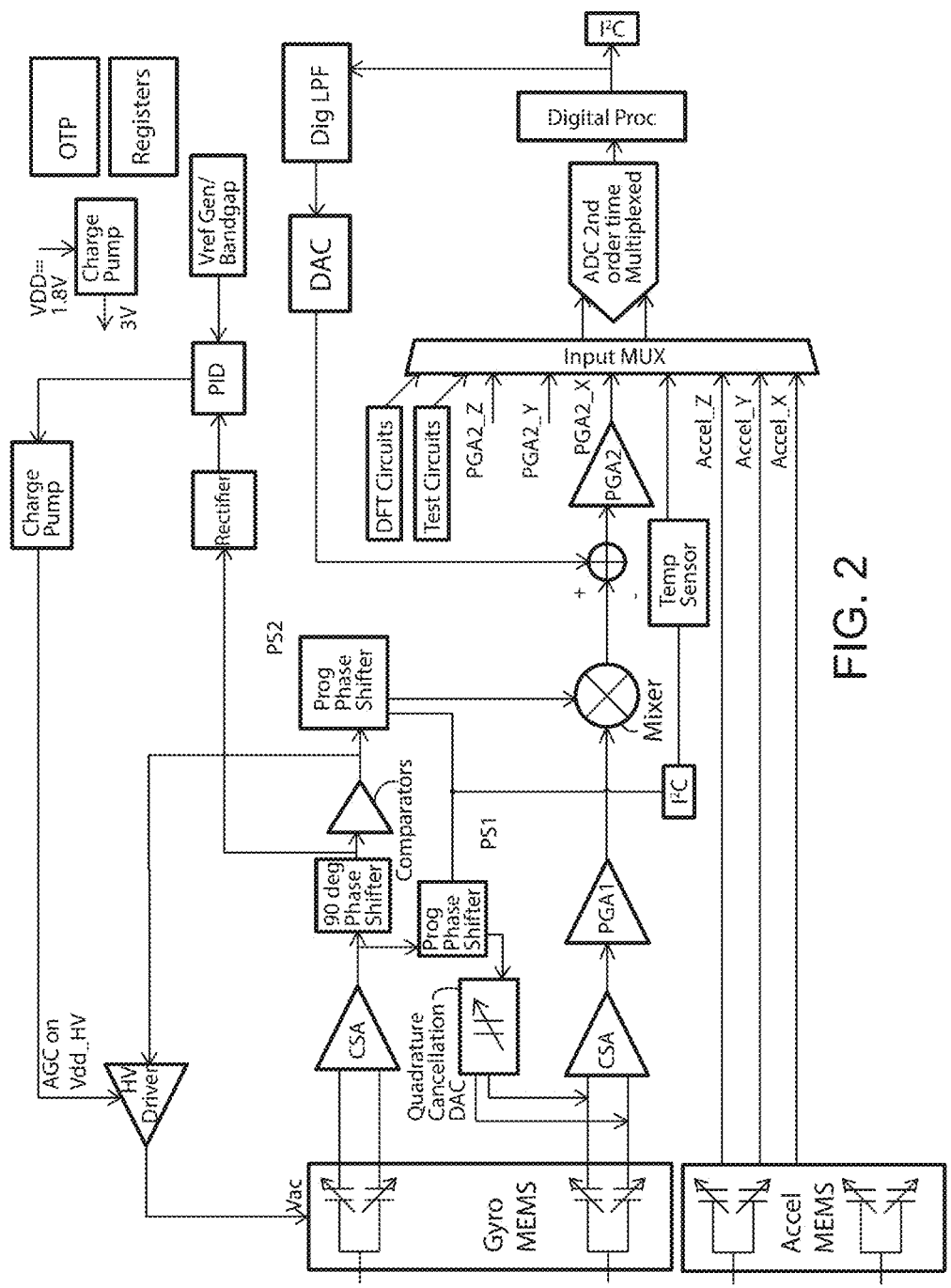
FIG. 2 is a simplified block diagram illustrating an integrated MEMS inertial sensing system according to an embodiment of the present invention.

FIG. 2 is a simplified block diagram illustrating an integrated MEMS inertial sensing system according to an embodiment of the present invention. In embodiment, the system can include a 6-axis gyroscope plus accelerometer architecture and signal processing. As shown, this figure illustrates a system with an architecture with a 6 Degree of Freedom (DOF) Gyroscope and Accelerometer. The system can include charge sense amplifiers (CSA), programmable gain amplifiers (PGA), A/D converters (ADC), D/A converters (DAC), low pass filters (LPF), serial bus I2C, proportional-integral-derivative (PID) controllers, high voltage (HV) filters, and others. These system components can be provided within a CMOS IC layer having a CMOS surface region. In a specific embodiment, the CMOS IC layer can include an ASIC (Application Specific Integrated Circuit), which includes these system components.

Figure 3:
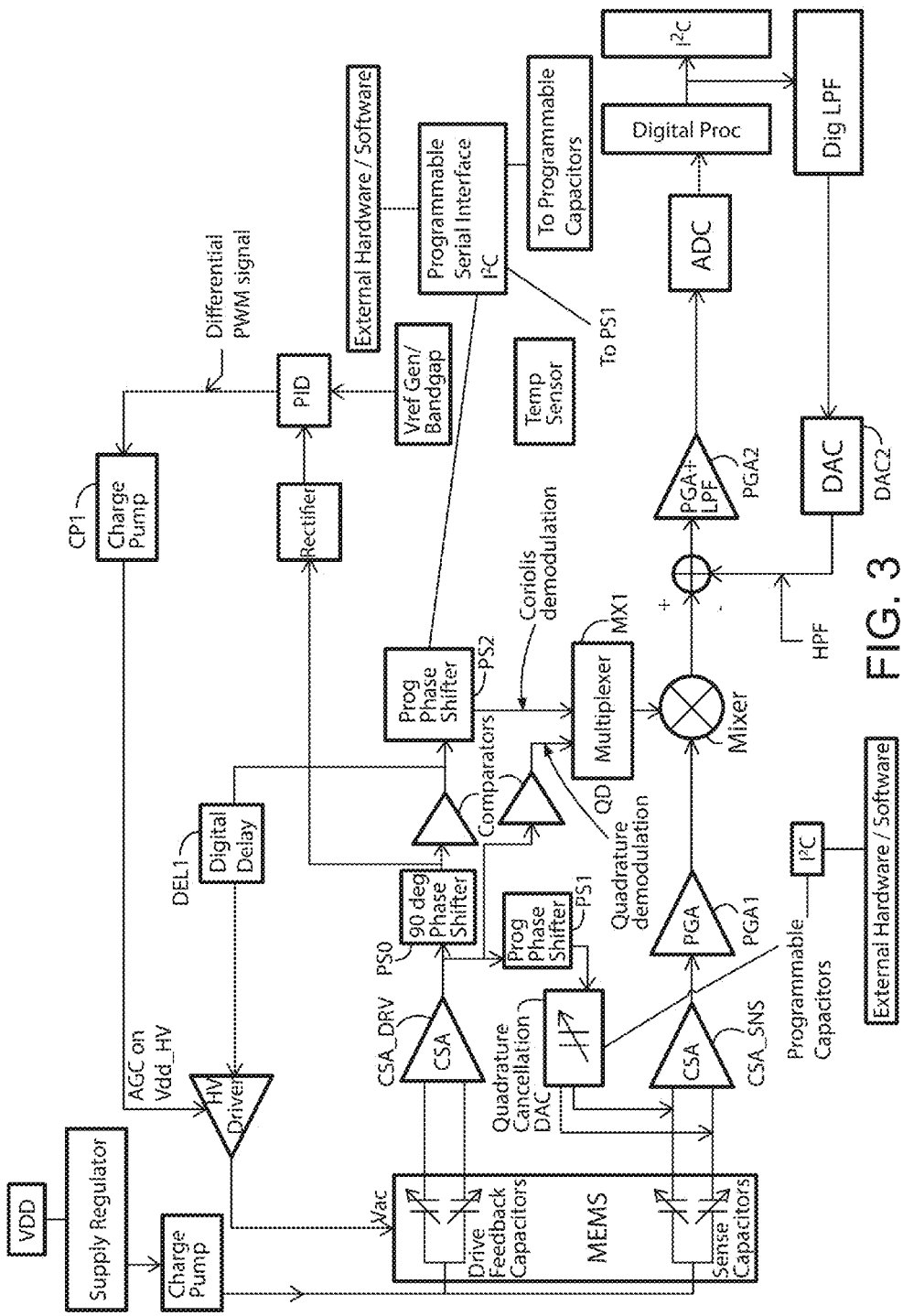
FIG. 3 is a simplified block diagram illustrating a system having an integrated MEMS gyroscope architecture according to an embodiment of the present invention.

MEMS block shown in FIG. 2 is integrated multi-axis MEMS gyroscope plus Accelerometer element. The sensing element is shown as capacitive but other sensing elements are also possible and the first amplifier interfacing with the MEMS element is designed appropriately. The MEMS gyroscope can include sense capacitors coupled to a sense path and drive feedback capacitors coupled to a drive path. As shown, the X, Y, and Z axis outputs of the MEMS gyro from a programmable gain amplifier (PGA2) are shown to be coupled to an input multiplexer. Further details regarding the architecture of the integrated MEMS gyroscope are shown in FIG. 3. In various embodiments, the integrated MEMS device can be configured for multiple sensors beyond the gyroscope and accelerometer. These physical sensors can be coupled to the same shared ASIC in the CMOS IC layer.

The present invention also includes an integrated MEMS accelerometer coupled to the MEMS gyroscope system. The accel MEMS block, which can be a single or multi-axis MEMS accelerometer element, also includes an X, Y, and Z axis output that are coupled to the input multiplexer. This input multiplexer is coupled to an analog/digital converter (ADC). One of the inputs of the A/D converter is from on chip temp sensor, which can be multiplexed along with the other MEMS sensors. The measured temperature from the on-chip temp sensor can be used to dynamically compensate for temperature variation, including quadrature cancellation variation with temperature and phase shift changes. In a specific embodiment, the ADC can be a high resolution (e.g. 16 bit) A/D converter converts the demodulated rate signal.

The ADC can be of any standard architecture and can multiplex the input signals from multiple sensors in time-multiplexed manner. The ADC can be a multiple channel ADC that is shared among the multiple MEMS sensors, such as the accel and gyro. The A/D converter has input for multiple channels in order to multiplex the digital signal path for all the channels. The ADC can multiplex the input signals from multiple sensors in time-multiplexed manner, which can include a $2^{nd}$ order time multiplexed manner. This multiplexing allows the ADC and the digital circuits to be shared across more than one sensor. Additionally, Design for Testability (DFT) and various test circuits can be multiplexed at the input of the ADC. These DFT and test circuits can test for quadrature of the gyroscope or resonance Q of the system. These test devices can be time multiplexed in order to periodically gather data and apply corrections or used for trimming devices In a specific embodiment, this configuration with a 3-axis gyro and a 3-axis accel results in a 6 degrees-of-freedom (DOF) integrated inertial sensor system. A key invention is how to share the electronic circuitry in order to achieve smallest size 6-DOF system. Layout of the Gyroscope and Accelerometer MEMS and CMOS is very critical to achieve optimal performance. This invention shown in FIG. 2 uses a multi-input ADC that acts as inputs to multiple channels of Accel (e.g. 3 axis Accel) as well as processed demodulated signals from Gyroscope.

The digital path has similar functionality requirements for multiple inertial sensors (e.g. both Gyro and Accel require offset cancellation, programmable digital gain, Low pass filter etc.). In the proposed invention, the digital path is completely shared among the 6 DOF sensors. External communication such as I2C or SPI is also shared among multiple sensors. Charge pumps can also be shared across multiple sensors (e.g. Accel & gyro). In addition, reference generators such as bandgap, bias circuits, clock generator, temp sensor etc. can be effectively shared.

All the out of plane sense signal plates are shielded with metal shield on sides (on same metal layer) as well as on layers below the sense plates. A shield may be placed by skipping one or more metal layers to minimize parasitic capacitance. For example, if sense plate is on Metal 6, the shield may be on metal 4 instead of Metal 5 in order to provide more isolation & reduce parasitics. Those of ordinary skill in the art will recognize other variations, modifications, and alternatives.

FIG. 3 is a simplified block diagram illustrating a system having an integrated MEMS gyroscope architecture according to an embodiment of the present invention. Some included components are the Charge Sense Amplifiers (CSA), Programmable Gain Amplifier (PGA), Low Pass Filter (LPF), I2C. The CSAs is used for processing signals from the drive path as well as sense path of a Gyroscope or other MEMS inertial sensing device. The I2C is a serial bus communication to digital registers on the chip. In a specific embodiment, the rectifier, comparator, Proportional-Integral-Derivative (PID) controller, High Voltage (HV) driver, MEMS resonator, CSA_DRV and the 90 degree phase shifter, PS0, form an Automatic Gain Control (AGC) loop.

The MEMS block shown in FIG. 3 is a single or multi-axis MEMS gyroscope element. The sensing element is shown as capacitive but other sensing elements are also possible and the first amplifier interfacing with the MEMS element is designed appropriately. In an embodiment, the gyroscope architecture includes a drive loop configuration for an integrated MEMS inertial sensing device (i.e. gyroscope). The MEMS gyroscope has a drive element or drive resonator that needs to resonate continuously at desired frequency and amplitude.

When the MEMS drive resonator generates signal at lower amplitude than desired, the AGC loop needs to act in a way that will increase the force to the MEMS driver resonator which will, in turn, increase the feedback signal. The amplitude of the rectified signal from the CSA is smaller compared to the reference signal provided to the PID. The PID block generates output in proportion to the difference of the input signals. The output of the PID block controls the gain of the HV driver, which decides the amplitude of the ac voltage, Vac, driving the MEMS resonator. On the other hand when the MEMS drive resonator generates signal at higher amplitude than desired, the AGC loop needs to act in a way that will decrease the force to the MEMS driver resonator which will, in turn, decrease the feedback signal. In an embodiment, this invention proposes an implementation of this AGC mechanism in an efficient way at low power.

The displacement generated by the resonator is proportional to the input force and the Q of the resonator. E.g. larger the Q, larger is the displacement. Also, for a given Q, larger the force, larger is the displacement of MEMS drive element. A larger displacement of MEMS element generates a larger signal (for example as capacitance change). Thus, the AGC loop acts in a way that generated desired signal amplitude out of the drive signal and equivalently, maintains MEMS resonator velocity as desired frequency and amplitude.

The sensing mechanism of the gyroscope is based on a Coriolis force, which is proportional to the vector product of angular rate of the gyroscope and the velocity of the MEMS driver resonator. The Coriolis force generates a displacement of the MEMS sense element in a direction that is orthogonal to the drive velocity and the external angular rate. The displacement signal is sensed via a sense Charge Sense Amplifier (CSA). The signal at the output of the sense CSA will have a carrier signal at the frequency of the resonance of the drive resonator, which will be amplitude modulated by a signal proportional to the angular rate of motion.

In a specific embodiment, a drive CSA (CSA_DRV) within the architecture senses the change in capacitance due to drive element and converts it in to voltage signal. In order to provide in-phase feedback signal, a 90 degree phase shifter, PS0, is added in the drive loop. The 90 degree phase shift can be implemented as differentiator or integrator or other known techniques.

In an embodiment, the rectifier, comparator, Proportional-Integral-Derivative (PID) controller, High Voltage (HV) driver form an Automatic Gain Control (AGC) loop. When the MEMS drive resonator generates signal at lower amplitude than desired, the amplitude of the rectified signal from the CSA, used for processing signal from drive path as well as sense path of Gyroscope, is smaller compared to the reference signal provided to the PID. The PID block generates output in Proportion to the difference of the input signals. The output of the PID block drives the charge pump. Output of PID block will be proportional to the difference in reference voltage input to the PID and the rectified signal amplitude. If output of PID is higher, then charge will provide larger voltage output.

The rectifier block rectifies the signal from phase shifter. A low pass filter (LPF) may typically be applied to this signal to provide average envelope of the detected feedback signal. The average amplitude is then compared with the desired amplitude provided by the reference signal coming from band-gap or similar on-chip or off-chip reference in the PID controller.

The PID block provides multiple functionalities in the Automatic Gain Control (AGC) loop. During the normal operation, when the loop is closed, the output of the PID block is proportional to the difference in amplitude between 'magnitude' of the detected signal (based on envelope information provided by rectifier), to the reference signal Vref. The proportional functionality may have some gain or may be unity. In order for the loop to filter out fast transients and act on 'average' information, the PID block incorporates an 'Integrator'. The time constant of the integrator is kept programmable so that the AGC loop can either be made faster or slower. However, before the drive loop is closed, for example right after power-up of Gyro, it is desired that the AGC loop act much faster instead of averaging for a long time. This functionality is implemented by the 'Differentiator' of the PID block. The differentiator allows shorter time to close the loop which helps in smaller 'start-up time' for the Gyroscope.

The PID block also provide a differential signal, which is necessary for kick-start of the AGC loop in order to pump up the charge pump output faster especially during power on. In the normal mode, an integrator integrates the output of PID so that noise pulses do not cause undesired changes in the AGC path and makes the steady state error to be zero. The output of the PID block is proportional to the difference between the rectified and filtered drive feedback (CSA_DRV) signal and desired reference. In one of the embodiments of this invention, a Pulse Width Modulated (PWM) signal is derived based on output of PID block.

In an embodiment, a triangle wave generator is used to generate triangular pulses. For example, this waveform may be implemented by linearly charging & discharging capacitor. The triangular waveform is then compared with output of the PID in the 'comparator' block. If the PID block output is at desired level (Vref), then the comparator outputs PWM pulses that maintain current value out of the charge pump. If the PID block output is lower than desired, the duty cycle of the PWM pulses is effectively increased. If the PID block output is higher than desired, the duty cycle of the PWM pulses is effectively reduced.

In an embodiment, the AGC is implemented as combination of Charge pump acting as power supply to the HV driver. If charge pump output is higher, the HV driver outputs proportionally higher amplitude pulses which will inject more Force, proportional to product of dc and ac voltage output from HV driver, in to MEMS driver-resonator. The HV driver can be either analog HV amplifier or simple inverter.

The supply voltage of HV driver is provided from charge pump CS1. In one of the embodiments of this invention, the charge pump CP1 provides one means of controlling the output amplitude from HV driver, which effectively provides automatic gain controlled ac pulses to the Gyro resonator. In a specific embodiment, the HV driver can be implemented as a simple digital gate. The power supply to the HV driver can be controlled using a charge pump CP1.

The HV driver can also be replaced by a conventional external supply (VDD) at any desired voltage, such as 1.8V or others.

Output of charge pump is proportional to the PWM duty cycle. For example, charge pump architecture is designed in order to increase the charge pump output amplitude when duty cycle of PWM is higher than 50%, reduce it when duty cycle is less than 50% and maintain the output at the current value when the duty cycle is 50%. One of the benefits of proposed AGC loop is that the charge pump, inherently includes a 'time constant' for charging up of its output voltage. This incorporates the Low pass functionality in to the AGC loop without requiring additional circuitry.

In a specific embodiment, an additional charge pump, CS2, can be used to allow external power supply voltage that can be lower compared to on-chip voltages. For example, the external power can be 1.8V and internal voltages can be 3.3V and much higher voltages at charge pump for HV driver. The multiple charge pump architecture allows more efficient usage of power. For example, the boosting of external supply voltage 1.8V may have to be boosted to 32V. This can be done as boost from 1.8V to 3.3V and from 3.3V to 32V. This feature will allow usage of device at higher voltage to bypass one of the charge pumps CS2.

In an alternative embodiment, the HV driver is directly powered by external VDD. In another embodiment, the HV driver can be powered by Charge pump CP1 which is not modulated in amplitude.

The displacement generated by the resonator is proportional to the input force and the Q of the resonator. (e.g. larger the Q, larger is the displacement.) Also, for a given Q, the larger the force, the larger is the displacement of MEMS drive element. Larger displacement of the MEMS element generates a larger signal (for example as capacitance change). Thus, the AGC loop acts in a way that generates a desired signal amplitude out of the drive signal and equivalently, maintains MEMS resonator velocity as desired frequency and amplitude.

The drive signal also gets injected in the sense path and is 90 degrees out of phase compared to the Coriolis displacement, and hence is termed "Quadrature coupling". A programmable Quadrature cancellation DAC is an array of programmable capacitors of high precision that allow a desired portion of the quadrature signal to be cancelled from the input signal. This programmable capacitor array can be configured via a serial interface and external hardware or software to control the quadrature cancellation for chip-to-chip variation, as well as for real time variation (e.g. temperature). In addition, to accurately cancel the quadrature, which may have a different phase than 90 deg, a phase shifter PS1 is used in the present architecture embodiment.

The CSA-sense is a low noise amplifier with capacitive feedback. In order to maintain DC biasing at the amplifier input, a very high impedance feedback at low frequency is required. In various embodiments of the present invention, this configuration is realized by using MOS transistors operating in a sub-threshold region that can create impedances in the order of Giga-ohms. The feedback to maintain input common voltage is only desired at DC. In order to ensure little impact of the high impedance common mode feedback and to minimize noise impact at high frequency, a very low cut-off frequency low pass filter is added in the feedback path.

The Programmable Gain Amplifier 1 (PGA1) amplifies the signal from CSA to a desired level. The rate signal needs to be demodulated from the signal at the output of sense CSA. The mixer in the signal path achieves the demodulation by mixing the carrier signal coming out from the drive CSA with the composite signal coming from the sense-CSA amplified by the PGA.

In a specific embodiment, the mixer is implemented as a differential transmission gate having its inputs driven by the drive CSA with or without PGA1 and controlled by demodulating pulses from the drive path with appropriate phase shifts. One input of the transmission gate is the pulse coming from the comparator after going through the programmable phase shifter PS2. Phase Shifter PS2 shifts pulses by a programmable amount from −180 deg to +180 deg thereby adjusting for both phase lead and lag between signal in drive loop verses signals in sense path.

In a specific embodiment, temperature compensation can be achieved by programming phase shifters PS1 and PS2 to be driven through a programmable serial interface based on temperature measured using an on-chip temperature sensor. Doing so will result in a demodulation and quadrature cancellation that is optimized with temperature. In another embodiment, temperature compensation loop for gyroscope that involves, reading chip temperature using on-chip Temp sensor via interface such as I2C. Processing of the temperature change can be done externally through software or hardware processor to come up with optimal correction that can be programmed back in to the chip using interface circuits such as I2C, SPI, or the like.

In an embodiment, the programmability of PS2, which implements programmable phase shifts for the demodulator, is controlled to compensate for phase variation in either direction (lead or lag). The programmable PS2 can be programmed real time through serial interface such as I2C or SPI to compensate for various variations from chip to chip during trimming or real time through an external host processor or any hardware or software to compensate (i.e. temperature compensation).

The Programmable Gain Amplifier PGA2 amplifies the demodulated rate signal. PGA2 also includes a Low Pass Filtering function. An embodiment of the present invention includes a LPF by simply adding a capacitor in the feedback path of the PGA2. Since the carrier component is suppressed with the LPF in the PGA2, the dynamic range can be effectively used for desired rate signal amplification before converting to a digital domain.

A small phase shift with respect to 90 degrees may exist in the CSA drive, which will generate DC or low frequency components after demodulation, thereby consuming dynamic range after the mixer. According to a specific embodiment, a programmable phase shifter, PS2, can be configured within the architecture to effectively cancel this component. The PS coupled to the comparator can be used to adjust the phase difference optimally to compensate for analog phase shifts and cancel out unwanted component of carrier (resonant) frequency.

According to another specific embodiment, a loop including or consisting of a digital low pass filter (LPF) and DAC2 can be provided within the architecture. This can be a DC offset or low frequency cancellation loop that is multiplexed by using the digital LPF and a digital/analog converter (DAC) forming a closed loop with one or more analog circuits before the ADC. This loop cancels a small offset or low frequency component that may exist in the signal path due to offsets of analog blocks or DC or low frequency components produced by the mixer that is not in the range of rate signal frequency. In another embodiment, the system can include a multiplexed high pass filter (HPF) that is implemented by multiplexing a digital LPF and a DAC and using a feedback loop an the analog circuits before the ADC (i.e. on the PGA that drives the ADC).

A high resolution (e.g. 16 bit) A/D converter (ADC) converts the demodulated rate signal. The A/D converter has inputs for multiple channels in order to multiplex the digital signal path for all of the channels. One of the inputs of the A/D converter is from the on-chip temperature sensor. The Temp sensor output can be effectively used to compensate for the effect of the resonator variation with temperature either in the analog or digital domain. In an embodiment, the temperature sensor output can be read and used to program the phase shifter PS2 to compensate for changes in phase occurring due to changes in temperature. Temperature compensation can also be applied in the digital path with certain programmability. Also, multiple axes (e.g. three axis for a 3 degrees of freedom (3DOF) Gyro) of the Gyro signal are multiplexed at the ADC.

The digital path can have signal processing such as programmable Low Pass Filters to cancel noise outside of a band of interest. The digital signal path also has a programmable High Pass Filter (HPF) to substantially eliminate DC components, offset, or very low frequency artifacts that are not within the expected rate signal band. In a specific embodiment, the programmable HPF can be configured at a frequency using the DAC (DAC2) and a digital LPF in feedback configuration.

The system architecture of FIG. 2 also shows a test mode that allows measurement of quadrature signal using blocks QD, comparator and multiplexer. In this embodiment, a voltage corresponding to the drive displacement is used to demodulate the signal form the MEMS sense capacitors. This mode is multiplexed with the 'normal' mode in which the voltage corresponding to the drive velocity is used to demodulate the signal from the MEMS sense capacitors. The quadrature mode provides a method to quantify the residual 'feed-through' or 'quadrature' signal from the MEMS drive capacitors to the sense capacitors, and to observe how it varies with ambient parameters such as temperature, humidity, etc.

In a specific embodiment, a digital delay, using block DELL is introduced in the frequency control loop of the drive servo. Varying the delay causes the loop to lock into different frequencies. For instance, the delay can be varied to make the loop lock into the 3-dB frequencies of the MEMS drive resonator and measure the 3 dB bandwidth and quality factor.

The layout of the Gyroscope MEMS and CMOS is very critical to achieve optimal performance. All the out of plane sense signal plates are shielded with metal shield on sides (on same metal layer) as well as on layers below the sense plates. In a specific embodiment, a shield may be placed by skipping one or more metal layers to minimize parasitic capacitance. For example, if sense plate is on metal 6, the shield may be on metal 4 instead of metal 5 in order to provide more isolation & reduce parasitics. An example is shown in FIG. 1, which shows that CMOS layer 120 can include processed CMOS devices (not shown) in substrate 110 and can including multilevel metal interconnect structures, e.g., six metal layers, M1-M6. The integrated MEMS inertia sensing device 100 also includes out-of-plane sense plates 121. Metal regions 151 and 152 are shields on the sides of the plates in the metal 6 layer, while 153 is the shield below the plates on the metal 4 layer.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system comprising an integrated multi-axis MEMS inertial sensor architecture, the system comprising:
    a substrate member having a surface region;
    a CMOS IC layer overlying the surface region, the CMOS IC layer having a CMOS surface region, the CMOS IC layer having an Application Specific Integrated Circuit (ASIC) comprising:
    an Automatic Gain Control (AGC) loop circuit, the AGC loop circuit including:
        a rectifier,
        a proportional-integral-derivative (PID) controller electrically coupled to the rectifier,
        a comparator electrically coupled to the PID controller,
        a charge pump electrically coupled to the comparator, and
        a high-voltage (HV) driver coupled to the charge pump;
        wherein the rectifier's output is coupled to an input of the PID controller, the rectifier's input connected to an input of a comparator, where both the input of the rectifier and an input of the comparator are coupled to the output of a 90 degree phase shifter, wherein the input of the charge pump is coupled to the output of the PID controller, and the output of the charge pump is coupled to an input of the HV driver;
    a sense path having Charge Sense Amplifier (CSA_SNS), a Programmable Gain Amplifier (PGA1), a mixer, another Programmable Gain Amplifier (PGA2), a Low Pass Filter (LPF), an A/D converter (ADC), and digital processing circuits;
    a MEMS gyroscope overlying the CMOS surface region, the MEMS gyroscope electrically coupled to the ASIC; and
    a MEMS accelerometer overlying the CMOS surface region, the MEMS accelerometer being electrically coupled to the ASIC;
    wherein the Application Specific Integrated Circuit (ASIC) further comprises an input multiplexer coupled to the A/D converter (ADC), wherein the MEMS gyroscope and MEMS accelerometer are coupled to the input multiplexer, wherein the ADC is shared between the MEMS gyroscope and MEMS accelerometer via the input multiplexer;
    wherein out of plane sense signal plates are shielded with metal shield on sides as well as on layers below the sense plates.

2. The system of claim 1 comprising a programmable analog phase shifter coupled to the 90 degrees phase shifter and the drive CSA to accurately cancel a quadrature component.

3. The system of claim 1 further comprising a quadrature cancellation DAC module having a programmable capacitor array of high precision configured via a serial interface to external hardware or software to control the quadrature cancellation for chip-to-chip variation and real time variation.

4. The system of claim 1 further comprising a programmable phase shifter (PS2) configured via a serial interface and external hardware or software to compensate for phase variations from chip to chip during trimming or real time.

5. The system of claim 1 wherein the mixer is implemented as a differential transmission gate being driven by the drive charge-sense-amplifier (CSA) with the Programmable Gain Amplifier (PGA1) and controlled by demodulating pulses from the drive CSA with phase shifts.

6. The system of claim 1 further comprising a digital delay module coupled to the comparator and the high-voltage (HV) driver, the digital delay module being configured to lock into a desired frequency.

7. The system of claim 1 further comprising a circuit loop including the digital low-pass-filter (LPF) coupled to a digital/analog converter (DAC), the circuit loop being coupled to the mixer or the Programmable Gain Amplifier (PGA2) to effectively cancel dc offsets or low frequency artifacts.

8. The system of claim 1 further comprising a programmable high-pass-filter (HPF) having a cut off frequency implemented using a digital/analog converter (DAC) and a digital Low Pass Filter (LPF) in a feedback configuration.

9. The system of claim 1 wherein the comparator is a first comparator, and further comprising a quadrature mode circuit including a second comparator and a multiplexer, wherein the quadrature mode circuit is configured to monitor a quadrature signal from the MEMS gyroscope.

10. The system of claim 1 further comprising a temperature compensation loop including an on-chip temperature sensor coupled to a serial bus interface (I2C), the on-chip temperature sensor and I2C being configured to provide temperature compensation based on external software or an external hardware processor.

11. The system of claim 1 wherein the HV driver is implemented as a simple digital gate, wherein the charge pump provides a power supply to the HV driver, providing automatic gain controlled ac pulses to the MEMS gyroscope.

12. An integrated multi-axis MEMS inertial sensing device, the device comprising:
    a substrate member having a surface region;
    a CMOS IC layer overlying the surface region, the CMOS IC layer having a CMOS surface region, the CMOS IC layer having an Automatic Gain Control (AGC) loop circuit, the AGC loop circuit including:
        a rectifier,
        a proportional-integral-derivative (PID) controller electrically coupled to the rectifier,
        a comparator electrically coupled to the PID controller,
        a charge pump electrically coupled to the comparator, and
        a high-voltage (HV) driver coupled to the charge pump;
        wherein the rectifier's output is coupled to an input of the PID controller, the rectifier's input connected to an input of a comparator, where both the input of the rectifier and an input of the comparator are coupled to the output of a 90 degree phase shifter, wherein the input of the charge pump is coupled to the output of the PID controller, and the output of the charge pump is coupled to an input of the HV driver;
    a first MEMS inertial sensor overlying the CMOS surface region, the first MEMS inertial sensor being electrically coupled to the AGC loop circuit; and
    a second MEMS inertial sensor overlying the CMOS surface region, the second MEMS inertial sensor being electrically coupled to the first MEMS inertial sensor;
    wherein out of plane sense signal plates are shielded with metal shield on sides (on same metal layer) as well as on layers below the sense plates.

13. The device of claim 12 wherein the PID controller is configured to output a differential PWM signal having a PWM signal and an inverted PWM signal, and wherein an output of the charge pump is configured to be proportional to a duty cycle of the PWM signal.

14. The device of claim 12 wherein the charge pump is configured as a power supply to the HV driver.

15. The device of claim 12 further comprising an input multiplexer coupled to an analog/digital converter (ADC), wherein the first and second MEMS inertial sensors are coupled to the input multiplexer, wherein the ADC is shared between the first and second MEMS inertial sensors via the input multiplexer.

16. The device of claim 15 wherein the input multiplexer is configured to operate in a time-multiplexed manner to share the ADC and one or more digital circuits across the first and second MEMS inertial sensors.

17. The device of claim 15 further comprising an on-chip temperature sensor, wherein the on-chip temperature sensor is coupled to the input multiplexer and is multiplexed to the ADC.

18. The device of claim 15 further comprising Design for Testability (DFT) circuits and test circuits, wherein the DFT circuits and test circuits are coupled to the input multiplexer and are time multiplexed to periodically gather data, apply corrections, or trim devices.

19. The device of claim 15 further comprising a low frequency cancellation loop having a digital low pass filter (LPF) and a digital/analog converter (DAC) coupled to the input multiplexer and being multiplexed to the ADC.

20. The device of claim 15 further comprising a high pass filter (HPF) having a digital low pass filter (LPF) and a DAC configured in a feedback loop coupled to the input multiplexer and being multiplexed to the ADC.

* * * * *